US00RE46832E

(19) United States
(12) Reissued Patent
Hunt et al.

(10) Patent Number: US RE46,832 E
(45) Date of Reissued Patent: May 8, 2018

(54) ELECTROMAGNETIC LOCK HAVING DISTANCE-SENSING MONITORING SYSTEM

(71) Applicant: Hanchett Entry Systems, Inc., Phoenix, AZ (US)

(72) Inventors: Robert C. Hunt, Reno, NV (US); Thomas Edward Roth, Reno, AZ (US)

(73) Assignee: Hanchett Entry Systems, Inc., Phoenix, AZ (US)

(21) Appl. No.: 15/254,659

(22) Filed: Sep. 1, 2016

Related U.S. Patent Documents

Reissue of:
(64) Patent No.: 8,820,803
Issued: Sep. 2, 2014
Appl. No.: 12/396,018
Filed: Mar. 2, 2009

(51) Int. Cl.
*E05C 17/56* (2006.01)
*E05B 65/10* (2006.01)
*E05C 19/16* (2006.01)
*E05B 43/00* (2006.01)

(52) U.S. Cl.
CPC ..... *E05B 65/108* (2013.01); *E05C 19/166* (2013.01); *E05B 43/005* (2013.01); *Y10S 292/65* (2013.01); *Y10T 70/625* (2015.04); *Y10T 70/7028* (2015.04); *Y10T 70/7057* (2015.04); *Y10T 292/11* (2015.04)

(58) Field of Classification Search
CPC .. E05B 65/108; E05B 65/1046; E05B 43/005; E05C 19/166; Y10S 292/65; Y10T 70/7057; Y10T 70/7028; Y10T 70/625; Y10T 70/7006; Y10T 70/7011; Y10T 70/7045; Y10T 292/11
See application file for complete search history.

(56) References Cited

U.S. PATENT DOCUMENTS 4,241,337 A * 12/1980 Prada ..... 340/547
4,287,512 A * 9/1981 Combs ..... 340/542
4,359,646 A * 11/1982 Mejia et al. ..... 307/116
4,487,439 A * 12/1984 McFadden ..... 292/251.5
(Continued)

OTHER PUBLICATIONS

"Build Your Own Gaussmeter," Jan. 10, 2006; http://www.coolmagnetman.com/magmeter.htm.

*Primary Examiner* — Patricia Engle
(74) *Attorney, Agent, or Firm* — Woods Oviatt Gilman LLP; Ronald J. Kisicki, Esq.

(57) ABSTRACT

An emergency exit door lock system configured to cooperate with a door hinged in a door frame for sensing when a person attempts to open the door, and for allowing the door to open after a subsequent delay. The system comprises an electromagnet affixable to a door frame for electromagnetically attracting an armature resiliently affixed at a variable armature separation distance to an armature mounting device, the device being affixable to the door. A proximity sensor including an analog Hall Effect device is mountable to the frame for detecting movement of the door away from a closed position. A controller, such as a micro-controller, receives a signal from the sensor and causes an alarm as a function of the signal. The signal is indicative of the armature separation distance, the controller being calibrateable to provide a door alarm signal and door opening signal at any desired value of the armature separation distance.

18 Claims, 4 Drawing Sheets

(56) References Cited

U.S. PATENT DOCUMENTS

| | | | | | |
|---|---|---|---|---|---|
| 4,516,114 | A | * | 5/1985 | Cook | 340/542 |
| 4,652,028 | A | * | 3/1987 | Logan et al. | 292/251.5 |
| 4,686,792 | A | * | 8/1987 | Terrian | 49/61 |
| 4,703,962 | A | * | 11/1987 | Kelly et al. | 292/251.5 |
| 4,720,128 | A | * | 1/1988 | Logan et al. | 292/251.5 |
| 4,763,937 | A | * | 8/1988 | Sittnick et al. | 292/251.5 |
| 4,806,910 | A | * | 2/1989 | Salzer | 340/547 |
| 4,893,852 | A | * | 1/1990 | Harris et al. | 292/251.5 |
| 4,915,431 | A | * | 4/1990 | Bailey | 292/251.5 |
| 5,063,372 | A | * | 11/1991 | Gillett | 340/547 |
| 5,184,855 | A | * | 2/1993 | Waltz et al. | 292/251.5 |
| 5,429,399 | A | * | 7/1995 | Geringer et al. | 292/92 |
| 5,455,562 | A | * | 10/1995 | Chin | 340/547 |
| 5,496,079 | A | * | 3/1996 | Frolov | 292/251.5 |
| 5,534,849 | A | * | 7/1996 | McDonald et al. | 340/517 |
| 5,758,913 | A | * | 6/1998 | Roth et al. | 292/251.5 |
| 6,053,546 | A | * | 4/2000 | Frolov | 292/251.5 |
| 6,271,751 | B1 | * | 8/2001 | Hunt et al. | 340/514 |
| 6,583,616 | B1 | * | 6/2003 | Bomya | 324/207.17 |
| 6,586,926 | B1 | * | 7/2003 | Bomya | 324/207.17 |
| 6,609,738 | B1 | * | 8/2003 | Roth et al. | 292/251.5 |
| 6,992,478 | B2 | * | 1/2006 | Etherington et al. | 324/207.2 |
| 7,049,914 | B2 | * | 5/2006 | Lamb et al. | 335/216 |
| 7,142,113 | B2 | * | 11/2006 | Lian et al. | 340/547 |
| 7,205,872 | B2 | * | 4/2007 | Baechle et al. | 335/207 |
| 7,242,297 | B2 | * | 7/2007 | Vogt | 340/547 |
| 7,417,543 | B2 | * | 8/2008 | Bergman et al. | 340/545.6 |
| 7,999,644 | B2 | * | 8/2011 | Nakayama et al. | 335/207 |
| 2004/0212503 | A1 | * | 10/2004 | Stilp | 340/572.1 |
| 2007/0139195 | A1 | * | 6/2007 | Jin et al. | 340/547 |
| 2009/0140858 | A1 | * | 6/2009 | Gore et al. | 340/547 |
| 2010/0045053 | A1 | * | 2/2010 | Dye et al. | 292/201 |

* cited by examiner

ELECTROMAGNETIC LOCK HAVING DISTANCE-SENSING MONITORING SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present invention relates to electromagnetic locks; more particularly, to an apparatus for monitoring the lock status of electromagnetic locks; and most particularly, to an improved electromagnetic lock monitoring system employing an analog Hall Effect sensor to determine a continuously variable separation between a door and a frame.

BACKGROUND OF THE INVENTION

Electromagnetic locks for securing doors or gates are well known in the prior art. In a typical installation, a magnetically-susceptible keeper plate is mounted on a door, and an electromagnet is mounted on a door frame. When the electromagnet is energized and is in contact with the keeper plate with the door closed, the plate becomes an armature for the electromagnet, thus providing a mechanism for locking the door to the frame. When the magnetic loop is complete, by contact of the armature with the electromagnetic, the magnetic flux density is at a maximum.

In some access control systems used, for example in doors used in conjunction with fire control and emergency exits, it is desirable to provide delayed egress through an emergency door. Delayed egress is when an access control system must provide guaranteed egress within a fixed period of time while also providing notification to security personnel during that same period of time that egress is required. During the delayed egress time period, while a small gap exists between the door and frame, the door is kept in the locked state with power continuing to be supplied to the electromagnet. At the end of the delay period, power is removed from the electromagnet thus allowing free egress. Within the time period before de-energizing, a shorter "nuisance delay" period exists to deal not only with accidental striking of the door, but also with thwarted attempts of vandalism as might be expected from young persons who would push the door, hear the alarm, and then run away. If action to open the door ceases during the nuisance delay period, the alarm also ceases and the system remains armed for the next opening attempt. On the other hand, if the attempt to open the door is sustained for longer than the nuisance delay period, say after 15 or 30 seconds, the signal to open the door becomes irrevocable, the electromagnet is de-energized at the end of the irrevocable time, and the door is permitted to fully open. Such systems are in broad use, particularly in retail establishments where they greatly reduce theft loss while complying with building codes that require a minimum number of emergency exits.

In know systems, a gap can occur between the frame and the door because the keeper plate (armature) is not rigidly fastened to the door but rather floats on an armature mounting device which is fixed to the door. See, for example, U.S. Pat. No. 6,609,738 B1, the relevant disclosure of which is incorporated herein by reference. Consequently, pressure on the emergency door can create a gap between the door and the door frame of, typically, up to about one inch (2.54 cm.). In some security applications, it is essential that the door not be allowed to clear the frame during the nuisance delay period, to prevent passing of, for example, documents; thus, in some applications a gap as small as about 0.125 inches (0.32 cm.) must be detected.

It is known in the cited prior art to employ a digital device based upon the Hall Effect, wherein the voltage potential orthogonal to a magnetic field is proportional to the strength of the magnetic field. Thus, attempted opening of an emergency door increases a starting gap between the sensor and a cooperating permanent magnet mounted on the door, reducing the strength of the sensor magnetic field, which reduction can be sensed by the Hall Effect sensor and an alarm provided by a cooperating micro-controller.

A known problem in use of prior art systems, such as is disclosed in U.S. Pat. No. 6,609,738, is that the digital Hall sensor signals can alarm only when the sensor/magnet gap reaches a predetermined value. Thus, the door/frame gap for each installation requires individual physical adjustment to obtain proper correlation between a desired door/frame gap setting and the preset sensor/magnet gap. For this reason, employing a single system design to accommodate a range of desired door/frame gap settings is unwieldy.

What is needed in the art is an improved Hall Effect gap detection and alarm system that may be easily set to provide an alarm at any desired gap size for any installation.

It is a principal object of the present invention to simplify the setting of an alarm or nuisance gap at any desired gap size for an electromagnetic lock installation, thus making an alarm system applicable to a wide range of door/gap requirements.

SUMMARY OF THE INVENTION

Briefly described, in access control systems used in conjunction with fire control, it is desirable to be able to provide delayed egress. To make delayed egress available, a fire exit door is provided with a rim exit device and suitable circuitry to ensure that the door is alarmed either locally or remotely for several seconds following pressure on the rim exit device and prior to actual release of the door. For systems employing an electromagnetic lock, a separation between the door and the door frame can occur because the armature keeper plate is not rigidly fastened to the door but rather floats on a spring-loaded mounting unit which is fixed to the door. Consequently, pressure on the rim exit device can create a gap between the door and the door frame of up to about 1 inch (2.54 cm.). This gap is then used to sense that egress is desired while the electromagnetic lock is still energized and the door is still secure. In some applications, it is a requirement to detect a door/frame gap as small as 0.125 inch (0.32 cm.).

In the prior art employing a digital Hall Effect proximity sensor, accurate and difficult adjustments of the electromagnetic lock and the spacing of the keeper plate from the door need to be made on an initial setup of a door and then may have to be frequently re-adjusted to maintain the required settings.

The present invention employs an analog Hall Effect proximity sensor in place of the prior art digital Hall Effect sensor. The analog sensor produces a continuous signal indicative of the spacing of the sensor from the permanent magnet and hence the gap between the door and the door frame. Calibration curves are provided to the micro-controller relating sensor signal strength to gap size. The analog Hall Effect sensor converts the magnetic field density to current that is provided to the analog-to-digital converter input of the micro-controller which stores the result. Subsequent movement of the door with respect to the frame results in a varying current input from the sensor to the micro-controller. The micro-processor then compares the new result with the old result and calculates a new value for door/frame gap, resulting in continuous, accurate measurement of the gap. Once an alarm limit for the gap is reached, a warning signal is emitted visually and/or audibly, and locally and/or remotely, to indicate that egress has been requested. Additional circuitry provides a variable duration for such annunciation, followed by eventual power removal from the electromagnetic lock, at which point the door may be opened and egress accomplished.

An important benefit of an electromagnetic lock in accordance with the present invention is that, with a continuously variable analog signal over the entire range of desired gaps, a single lock model may be used on any and all applications requiring any gap alarm annunciation within that range.

BRIEF DESCRIPTION OF THE DRAWINGS

The present invention will now be described, by way of example, with reference to the accompanying drawings, in which.

Corresponding reference characters indicate corresponding parts throughout the several views. The exemplifications set out herein illustrate currently preferred embodiments of the invention, and such exemplifications are not to be construed as limiting the scope of the invention in any manner.

DESCRIPTION OF THE PREFERRED EMBODIMENTS

Figure 1:
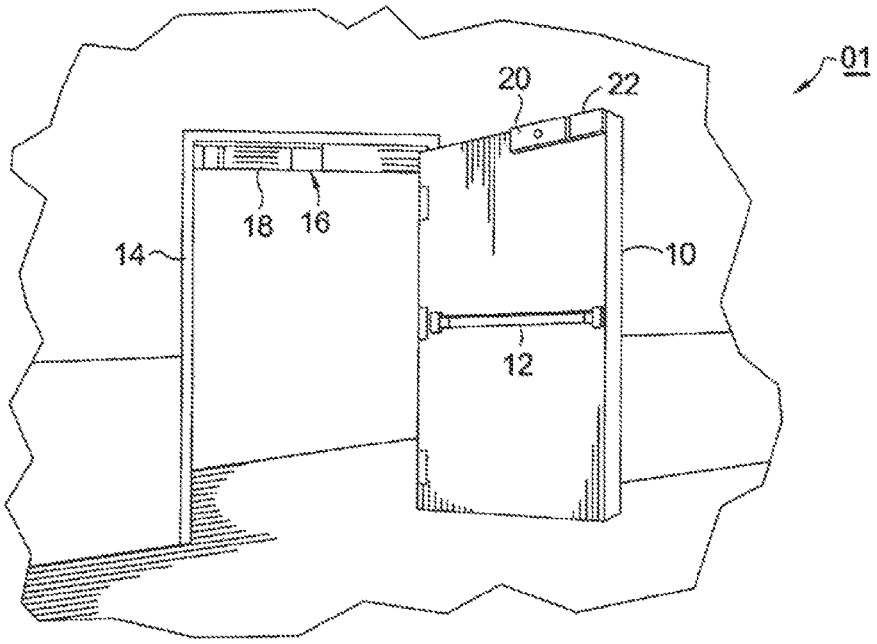
FIG. 1 is an isometric elevational view showing an electromagnetic lock system in accordance with the present invention installed in a door pivotably mounted to a frame.

Referring to FIG. 1, in an emergency delayed exit door system 01 in accordance with the present invention, door 10 is equipped with a panic bar 12 that operates a latch (not shown), the latch engaging a corresponding recess in door frame 14. Note that the latch could also be operated by a door knob or door lever set. Mounted to door frame 14 is an electromagnet assembly 16 including electromagnet 18. Door 10 is provided with an armature plate 20 for electromagnetically locking to electromagnet 18. To exit, a person presses on panic bar 12 and pushes the door outward for at least the nuisance delay period. The door will then be available for egress following the expiration of the typically 15 or 30 second egress delay period. This time period can be varied in the micro-controller code, as desired.

Figure 2:
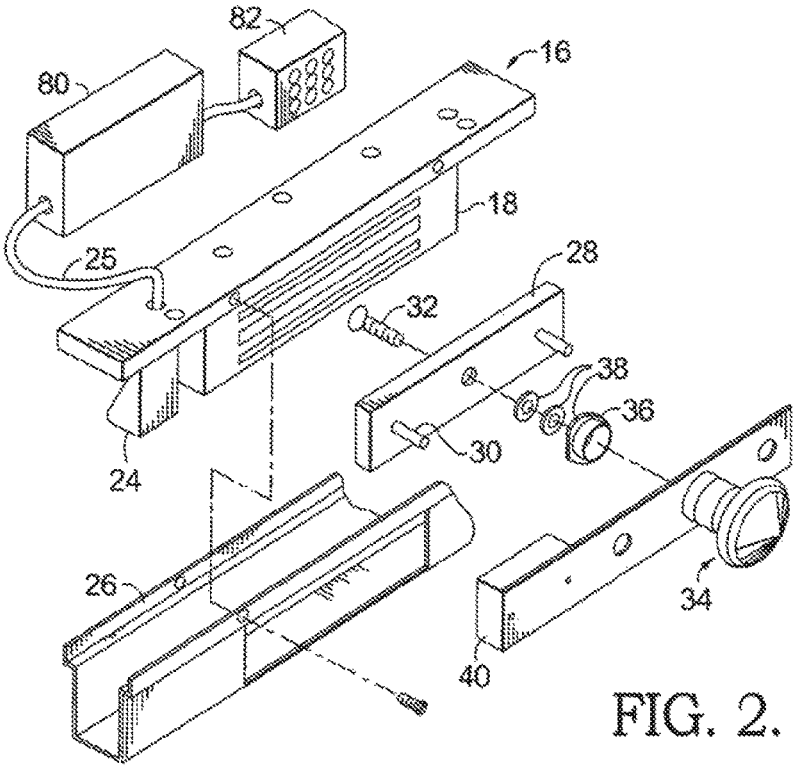
FIG. 2 is an exploded isometric drawing of an electromagnetic lock system in accordance with the present invention.
Figure 4:
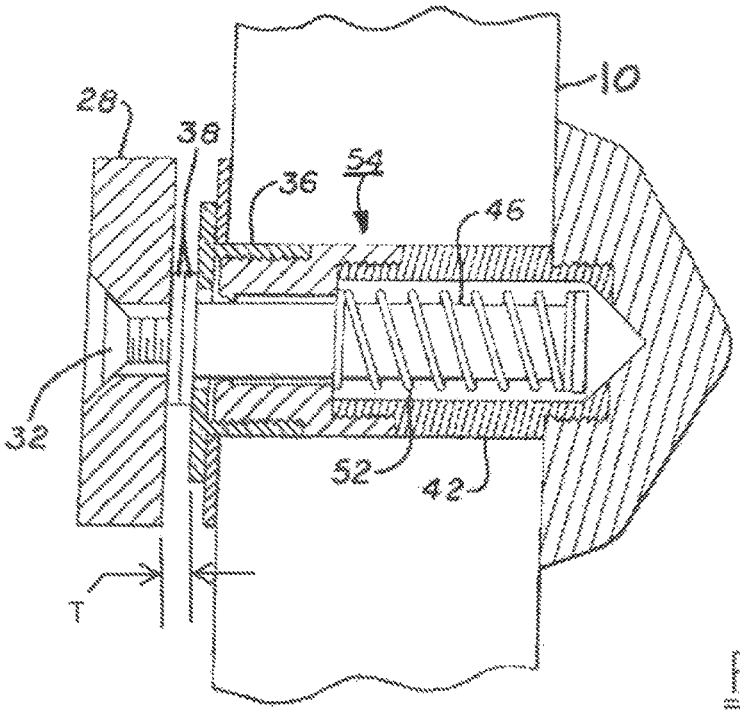
FIG. 4 is a cross-sectional view taken along line 4-4 in FIG. 3.

FIG. 2 shows major components of system 01 in greater detail. Electromagnet assembly 16 includes electromagnet 18, typically having an "E" shaped electromagnet core, and analog proximity sensor assembly 24. Electrical wires 25 serving sensor assembly 24 and electromagnet 18 feed up through the door frame header, and are not exposed. Assembly 16 includes a cover 26. Electromagnet armature 28 having one or more alignment pins 30 to prevent rotation is fastened via fastener 32 to armature mounting bolt 34. The shaft of armature mounting bolt 34 is fitted through a corresponding hole in door 10 (FIG. 1), and is secured thereto by a post-installation cap 36 which forms part of armature mounting bolt 34. One or more flexible washers 38 allow armature 28 to tilt slightly relative to door 10 such that armature 28 can abut electromagnet 18 in full contact with it for maximum locking hold force. The number and total thickness of washers 38 that are selected to provide overall thickness "T" (FIG. 4) also set the initial door/frame gap spacing and therefore serve as a starting gap adjustment mechanism, as described in greater detail below in connection with FIG. 7.

Permanent magnet 40 is also mounted to door 10 such that when door 10 is in its fully closed position, permanent magnet 40 is brought into sufficient proximity to sensor assembly 24 (FIG. 3) so that sensor assembly 24 detects that the door is fully closed. Controller 80, such as for example a micro-controller, is connected to sensor assembly 24 and electromagnet 18 by electrical wires 25, and is also connected to alarm 82.

Figure 3:
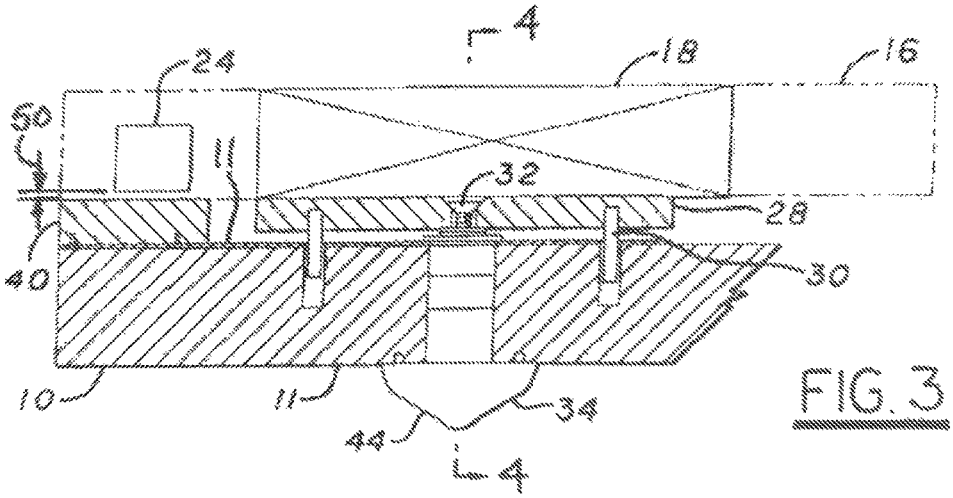
FIG. 3 is a cross-sectional view of the electromagnetic lock system shown in FIG. 2, showing a locked door in a non-alarm position within a frame.

FIG. 3 shows the electromagnetic lock installed in a door 10 and door frame, with the door in its fully closed position. Armature 28 abuts electromagnet 18 and is electromagnetically locked to it. As shown in detail in FIG. 4, within an armature mounting device 54, spring 52 defines a resilient member that biases plunger 46 into shaft 42 extending into or through door 10. This draws armature 28 toward door 10, thus providing a bias means mounted within a space defined by door 10 for providing a bias that urges the door toward its fully closed position. When the door is in its fully closed position, as in FIG. 3, permanent magnet 40 is sufficiently proximate to sensor assembly 24 by starting gap 50 to signal system controller 80 (FIG. 2) that the door is in its fully closed position.

Figure 5:
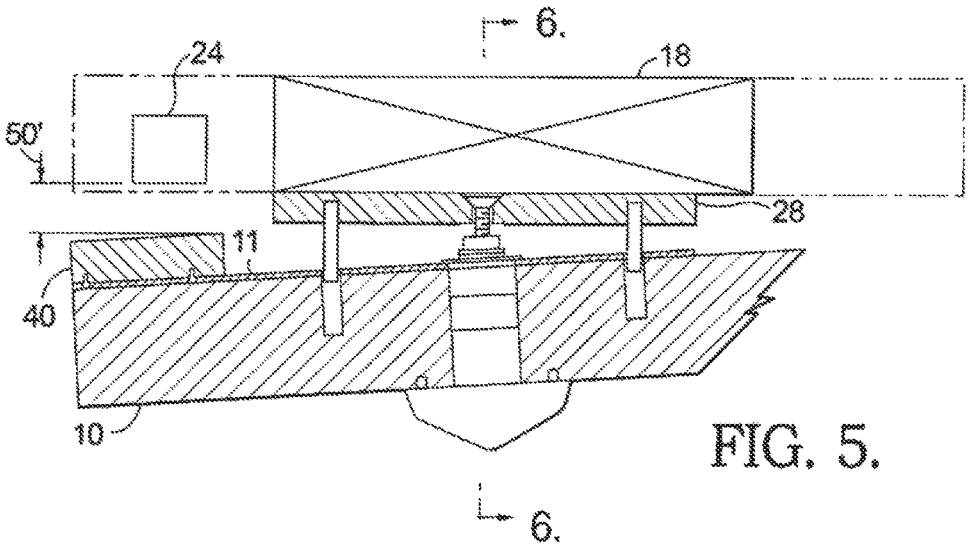
FIG. 5 is a cross-sectional view like that shown in FIG. 3, but showing the locked door in an alarm position.

FIG. 5 shows the components of FIG. 3 when someone is attempting to exit the building. The person first pushes panic bar 12 (FIG. 1) or similar door activating device to release the latch. Noting that armature 28 remains abutted to electromagnet 18, the person is able to push the door 10 away from its fully closed position (FIG. 3) to the activation position shown in FIG. 5 as activation gap 50', causing an alarm signal and initiating a "nuisance alarm" period. To do so, the person must supply sufficient external force to overcome the bias provided by spring 52. Spring 52 must therefore provide a small enough force so that even a small or frail person can push the door to the activation position. At the same time, the spring should provide enough bias so that when the door is pushed momentarily and then released, as for example by a vandal, the door will tend to overcome the closing resistance of the latch mechanism and return the door to its fully closed position. Accordingly, spring 52 is chosen to provide a bias force in the range of approximately 11 pounds. The spring can be pre-biased to provide a more constant bias force over the travel distance of plunger 46. Of course, the preferred force may be affected by development of building codes, as those codes develop with respect to systems such as that disclosed herein by themselves or in combination with other mechanisms attached to the door which may provide additional bias force. For example, the door may be equipped with a conventional door closer, and building codes may be passed that specify the maximum total force necessary to overcome the combination of mechanisms and open the door.

Figure 6:
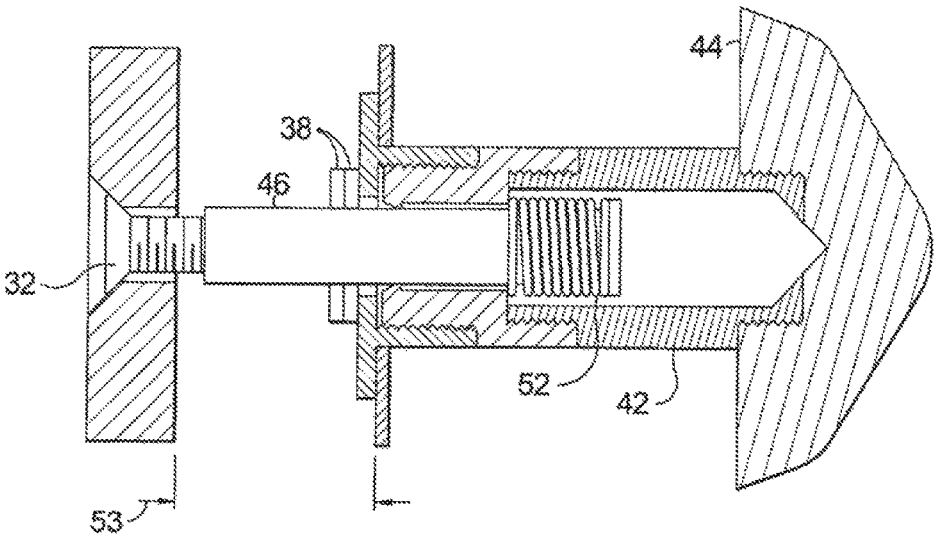
FIG. 6 is a cross-sectional view taken along line 6-6 in FIG. 5.

As shown in FIGS. 5 and 6, the external force applied to the door by a person wishing to exit causes plunger 46 to be drawn outward from tubular shaft 42, thus compressing spring 52. Since tubular shaft 42 is positioned within the hole in door 10, as the door is moved plunger 46 moves within the volume defined by door 10 in a direction corresponding to the thickness of the door. As used herein, the phrase "within" the door will be understood to mean "at least partially within" the door. Plunger 46 is free to move a distance of about one inch (2.54 cm.). If maximum possible travel distance is desired, armature mounting bolt head 44 could be formed such that plunger 46 extends into head 44 when the system is in its unforced state. In theory, this would allow plunger 46 to move a distance as much as or even more than the width of door 10. By allowing the plunger to move within the distance defined by the door thickness, the present invention achieves a much greater movement distance than could be achieved with prior art systems. These prior art systems provided only limited movement of the door, since slack was provided only within the armature plate. Since typical armature plates are on the order of one-half inch (1.27 cm), the total allowed lineal movement was small. In contrast, a typical security door is on the order of 1¾ inch (3.4 cm) thick. The present system therefore allows travel distances of at least about one inch (2.54 cm.).

There are several advantages to this greater travel distance. The first is that the activation distance 50' can be set far enough such that clearances within the space of the usual slack in the latch will not cause a false initiation of the system.

A second advantage is that it provides greater tactile and visual feedback to the person attempting to make an emergency exit. This provides greater assurance to a possibly panic-stricken individual that the door is functioning properly and will release shortly.

A third advantage is that with a greater travel distance, the sensors that sense when someone is attempting to exit need not be as precise in their ability to measure that the door has been moved a specified amount. This allows sensors to be more economical, more tamper-resistant, and/or easier to install and maintain.

The present system includes a sensor assembly 24 comprising an analog Hall Effect proximity sensor to sense when the door has been moved in an attempt to exit the building. A suitable analog sensor is, for example, Model ACS712, available from Allegro Microsystems, Inc., Worcester, Mass., USA.

Figure 7:
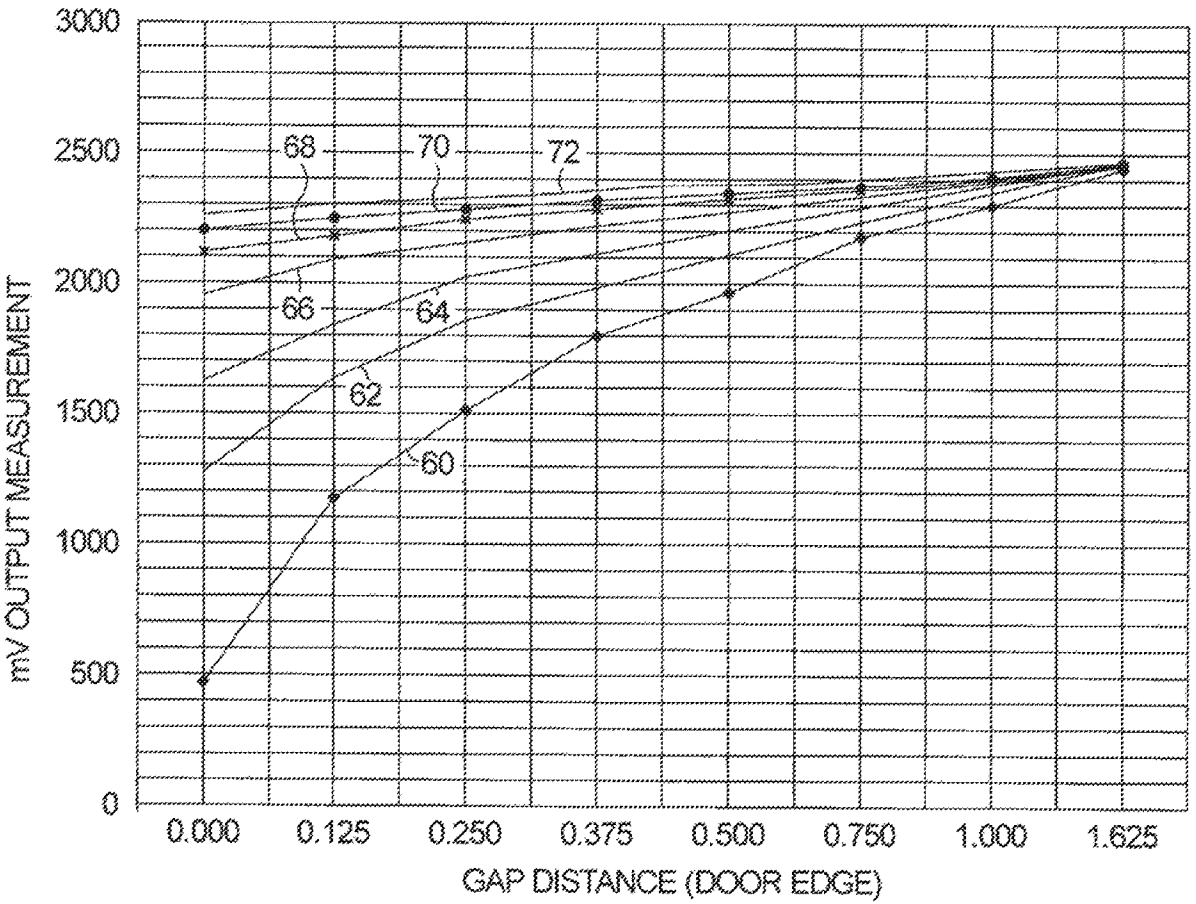
FIG. 7 is a graph showing sensor signal in millivolts as a function of gap distance for seven different starting gaps.

Referring now to FIGS. 3 through 7, analog sensor 24 produces a continuous signal the value of which is indicative of a plurality of instantaneous sensor separation distances 50' from permanent magnet 40 as permanent magnet 40 moves generally perpendicular relative to the face of analog sensor 24, which is proportional to an armature separation distance 53, between the armature and a door reference surface, and thus to a door/frame gap (not shown) as expressed in FIG. 7. As seen in FIG. 7, the plurality of instantaneous sensor separation distances may be any distance between and including when the door is in the closed position and the said door has reached an open position, such as the activation position. Preferably, analog Hall Effect sensor 24 is oriented north-pole seeking, as in FIG. 7, in which orientation the Hall output signal ranges from 0 volts (highest gauss) to 2500 millivolts (lowest gauss). If the sensor is oriented south-pole seeking, the Hall output signal ranges from 5000 millivolts (highest gauss) to 2500 millivolts (lowest gauss). Calibration curves, e.g., exemplary curves 60, 62, 64, 66, 68, 70, 72, are provided to the micro-controller relating sensor signal strength to gap size. Because various door/frame combinations can require different starting positions of armature 28 with respect to door reference surface 11, a starting gap adjustment mechanism may be used to accommodate a given door/frame spacing. For example, the starting gap adjustment mechanism may include one or more spacer washers 38 that may be varied upon installation of the system to select starting gap 50, as shown in FIG. 3, while accommodating a given door/frame spacing. It will be seen from FIG. 7, however, that increasing the number of spacer washers 38 serves to increase the size of starting gap 50 and to flatten the curve (compare curve 60 to curve 62 to curve 64). Thus the slope of the sensor response curve is a function of the total thickness of washers 38, expressed in FIG. 7 as the number of washers. Curve 60 represents 0 washers, and curves 62, 64, 66, 68, 70, 72 represent 1, 2, 3, 4, 5, and 6 washers, respectively. Thus, the overall thickness T of spacer washers 38 is selected to maximize the slope defined by the varying voltage values. It will further be seen that increasing the number of washers 38 includes in the starting gap adjustment mechanism increase the size of starting gap 50 and reduces the slope of the response curve, indicating a reduction in sensitivity of the sensor system. Preferably, no more than three washers are to be employed, although obviously the system is still effective with up to twice that number. Analog Hall Effect sensor 24 converts the field density of magnet 40 to current that is provided to the analog-to-digital converter input for the micro-controller 80 which stores the result. Subsequent movement of door 10 with respect to the frame results in a varying current input to the analog-to-digital converter input for the micro-controller-which compares the new result with the old result and calculates a new value for door/frame gap, resulting in continuous, accurate measurement of the gap. The system may be set to alarm at any predetermined desired millivolt value over the entire range of output of the sensor.

If the alarm condition (the "delay initiating signal") persists for more than the programmed nuisance delay, typically, only a few seconds, the system micro-controller begins a predetermined egress delay countdown, at the end of which (typically, about 15 seconds) the micro-controller issues a door unlock signal that causes electromagnet 18 to be de-energized. It will be noted that the magnetic field created by electromagnet 18 is sufficiently confined and directed such that the field does not affect the operation of the sensor within sensor assembly 24.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A door lock system configured to cooperate with a door movable in a door frame, the system being configured for sensing when said door in a locked mode is moved from a closed position toward an open position, and for allowing said door to become unlocked from said locked mode when said door is moved to an activation position after a subsequent delay, the system comprising:

a) an energizable electromagnet configured to be affixed to one of said door or said door frame for electromagnetically attracting an armature, said armature affixed to the other of said door or said door frame, wherein when said electromagnet is energized, said armature is attracted to said electromagnet when said door is in said locked mode;

b) a permanent magnet configured to be mounted to one of said door or said door frame;

c) a Hall Effect sensor configured for interacting with said permanent magnet and mounted to the other of said door or said door frame, wherein a distance between said Hall Effect sensor and said permanent magnet when said door is in said closed position defines a starting gap, and wherein said Hall Effect sensor is configured for detecting a plurality of instantaneous sensor separation distances between said Hall Effect sensor and said permanent magnet, said plurality of instantaneous sensor separation distances being any distance between and including when said door is in said closed position and when said door has reached said activation position;

d) a starting gap adjustment mechanism having a selectable overall thickness, wherein said overall thickness of said starting gap adjustment mechanism is selected to adjustably set said starting gap; and e) a controller configured for receiving a varying signal from said Hall Effect sensor, said varying signal having varying voltage values that are correlated to said plurality of instantaneous sensor separation distances, wherein each of said plurality of instantaneous sensor separation distances are proportional to a corresponding instantaneous door separation distance between said door and said door frame as said door is moved from said closed position toward said activation position, wherein said varying voltage values define a slope of a graph of said voltage values as said door is moved from said closed position toward said activation position, wherein said slope of said graph of said varying voltage values is reduced as said overall thickness of said starting gap adjustment mechanism is increased, and wherein said overall thickness of said starting gap adjustment mechanism is selected to maximize said slope defined by said varying voltage values.

2. A door lock system in accordance with claim 1 wherein said starting gap adjustment mechanism includes at least one washer.

3. A door lock system in accordance with claim 1 wherein said starting gap is between zero inches and about 1.625 inches.

4. A method for sensing when a door in a locked mode relative to a door frame is moved from a closed position toward an open position, and for allowing said door to become unlocked from said locked mode when said door reaches an activation position after a subsequent delay, the method comprising:

providing an energizable electromagnet configured to be affixed to one of said door or said door frame for electromagnetically attracting an armature, said armature affixed to the other of said door or said door frame, wherein when said electromagnet is energized, said armature is attracted to said electromagnet when said door is in said locked mode;

providing a permanent magnet configured to be mounted to one of said door or said door frame;

providing a Hall Effect sensor configured for interacting with said permanent magnet and mounted to the other of said door or said door frame, wherein a distance between said Hall Effect sensor and said permanent magnet when said door is in said closed position defines a starting gap, and wherein said Hall Effect sensor is configured for detecting a plurality of instantaneous sensor separation distances between said Hall Effect sensor and said permanent magnet, said plurality of instantaneous sensor separation distances being any distance between and including when said door is in said closed position and when said door has reached said activation position;

providing a starting gap adjustment mechanism having a selectable overall thickness, wherein said overall thickness of said starting gap adjustment mechanism is selected to adjustably set said starting gap;

providing a controller configured for receiving a varying signal from said Hall Effect sensor, said varying signal having varying voltage values that are correlated to said plurality of instantaneous sensor separation distances, wherein each of said plurality of instantaneous sensor separation distances are proportional to a corresponding instantaneous door separation distance between said door and said door frame as said door is moved from said closed position toward said activation position, wherein said varying voltage values define a slope of a graph of said voltage values as said door is moved from said closed position toward said activation position, and wherein said slope of said graph of said varying voltage values is reduced as said overall thickness of said starting gap adjustment mechanism is increased; and adjustably setting said starting gap between said Hall Effect sensor and said permanent magnet using said starting gap adjustment mechanism, wherein said overall thickness of said starting gap adjustment mechanism is selected to maximize said slope defined by said varying voltage values.

5. A method in according with claim 4 wherein said starting gap adjustment mechanism includes at least one washer.

6. A method in accordance with claim 4 wherein said starting gap is between zero inches and about 1.625 inches.

7. A method in accordance with claim 4 wherein said instantaneous door separation distance between said door and said door frame when said door is in said activation position is about 0.125 inches.

8. A method in accordance with claim 4 wherein an alarm signal is generated when said door reaches said activation position.

9. A method in accordance with claim 8 wherein said alarm signal is generated after a nuisance delay.

10. A method in accordance with claim 9 wherein said electromagnet is deenergized after said alarm signal is generated.

11. A method in accordance with claim 10 wherein said electromagnet is deenergized after a predetermined egress delay countdown.

12. A method in accordance with claim 11 wherein said predetermined egress delay countdown is about fifteen seconds.

*13. A door lock system configured to cooperate with a door movable in a door frame, the system being configured for sensing when said door in a locked mode is moved from a closed position toward an open position, the system comprising:*

*a) an energizable electromagnet configured to be affixed to one of said door or said door frame for electromag-*

*netically attracting an armature, said armature affixed to the other of said door or said door frame, wherein when said electromagnet is energized, said armature is attracted to said electromagnet when said door is in said locked mode;*

*b) a permanent magnet configured to be mounted to one of said door or said door frame;*

*c) a Hall Effect sensor configured for interacting with said permanent magnet and mounted to the other of said door or said door frame, wherein a distance between said Hall Effect sensor and said permanent magnet when said door is in said closed position defines a starting gap, and wherein said Hall Effect sensor is configured for detecting a plurality of instantaneous sensor separation distances between said Hall Effect sensor and said permanent magnet, said plurality of instantaneous sensor separation distances being any distance between and including when said door is in said closed position and when said door has reached said open position;*

*d) a starting gap adjustment mechanism having a selectable overall thickness, wherein said overall thickness of said starting gap adjustment mechanism is selected to adjustably set said starting gap; and*

*e) a controller configured for receiving a varying signal from said Hall Effect sensor, said varying signal having varying voltage values that are correlated to said plurality of instantaneous sensor separation distances, wherein each of said plurality of instantaneous sensor separation distances are proportional to a corresponding instantaneous door separation distance between said door and said door frame as said door is moved from said closed position toward said open position, wherein said varying voltage values define a slope of a graph of said voltage values as said door is moved from said closed position toward said open position, wherein said slope of said graph of said varying voltage values is reduced as said overall thickness of said starting gap adjustment mechanism is increased, and wherein said overall thickness of said starting gap adjustment mechanism is selected to maximize said slope defined by said varying voltage values.*

*14. A door lock system in accordance with claim 13 wherein said starting gap adjustment mechanism includes at least one washer.*

*15. A door lock system in accordance with claim 13 wherein said starting gap is between zero inches and about 1.625 inches.*

*16. A method for sensing when a door in a locked mode relative to a door frame is moved from a closed position toward an open position, the method comprising:*

*providing an energizable electromagnet configured to be affixed to one of said door or said door frame for electromagnetically attracting an armature, said armature affixed to the other of said door or said door frame, wherein when said electromagnet is energized, said armature is attracted to said electromagnet when said door is in said locked mode;*

*providing a permanent magnet configured to be mounted to one of said door or said door frame;*

*providing a Hall Effect sensor configured for interacting with said permanent magnet and mounted to the other of said door or said door frame, wherein a distance between said Hall Effect sensor and said permanent magnet when said door is in said closed position defines a starting gap, and wherein said Hall Effect sensor is configured for detecting a plurality of instantaneous sensor separation distances between said Hall Effect sensor and said permanent magnet, said plurality of instantaneous sensor separation distances being any distance between and including when said door is in said closed position and when said door has reached said open position;*

*providing a starting gap adjustment mechanism having a selectable overall thickness, wherein said overall thickness of said starting gap adjustment mechanism is selected to adjustably set said starting gap;*

*providing a controller configured for receiving a varying signal from said Hall Effect sensor, said varying signal having varying voltage values that are correlated to said plurality of instantaneous sensor separation distances, wherein each of said plurality of instantaneous sensor separation distances are proportional to a corresponding instantaneous door separation distance between said door and said door frame as said door is moved from said closed position toward said open position, wherein said varying voltage values define a slope of a graph of said voltage values as said door is moved from said closed position toward said open position, and wherein said slope of said graph of said varying voltage values is reduced as said overall thickness of said starting gap adjustment mechanism is increased; and*

*adjustably setting said starting gap between said Hall Effect sensor and said permanent magnet using said starting gap adjustment mechanism, wherein said overall thickness of said starting gap adjustment mechanism is selected to maximize said slope defined by said varying voltage values.*

*17. A method in accordance with claim 16 wherein said starting gap adjustment mechanism includes at least one washer.*

*18. A method in accordance with claim 16 wherein said starting gap is between zero inches and about 1.625 inches.*

* * * * *